United States Patent [19]

Krisa

[11] Patent Number: 4,861,221
[45] Date of Patent: Aug. 29, 1989

[54] VEHICLE LIFTING AND TOWING ATTACHMENT

[76] Inventor: Michael Krisa, R.D. 2, Box 50, Carbondale, Pa. 18407

[21] Appl. No.: 174,814

[22] Filed: Mar. 29, 1988

[51] Int. Cl.⁴ .............................................. B60P 3/12
[52] U.S. Cl. .................................... 414/563; 212/261; 280/402
[58] Field of Search ............... 414/563, 920; 280/402; 212/238, 261

[56] References Cited

U.S. PATENT DOCUMENTS

| | | | |
|---|---|---|---|
| 2,197,406 | 4/1940 | Fleming et al. | 414/563 |
| 3,158,266 | 11/1964 | Manaugh | 280/402 X |
| 3,715,042 | 2/1973 | Rellinger | 414/563 |
| 3,719,294 | 3/1973 | Aquila | 414/563 |
| 3,767,069 | 10/1973 | White, Jr. et al. | 414/563 |
| 3,888,369 | 6/1975 | Kesselring | 414/563 |
| 4,152,006 | 5/1979 | Dunlap | 414/563 X |
| 4,384,817 | 5/1983 | Peterson | 414/563 |
| 4,411,070 | 10/1983 | Boyum et al. | 212/238 X |
| 4,473,334 | 9/1984 | Brown | 280/402 X |
| 4,543,030 | 9/1985 | Hawkins | 414/563 |
| 4,555,214 | 11/1985 | Morton | 280/402 X |
| 4,611,968 | 9/1986 | Casteel | 414/563 |
| 4,664,585 | 5/1987 | Ambridge et al. | 414/563 |
| 4,708,358 | 11/1987 | Gehman et al. | 414/563 X |

*Primary Examiner*—David A. Bucci
*Attorney, Agent, or Firm*—Nies, Webner, Kurz & Bergert

[57] ABSTRACT

A lifting and towing attachment for use on a trailer cab having a conventional fifth wheel coupler, the attachment readily converting the cab for use in lifting and towing a disabled vehicle, particularly large vehicles such as dump trucks, buses, or other trailer cabs.

12 Claims, 3 Drawing Sheets

VEHICLE LIFTING AND TOWING ATTACHMENT

BACKGROUND OF THE INVENTION

This invention relates generally to apparatus for lifting and towing disabled vehicles, particularly large vehicles such as dump trucks, buses, trailer cabs with a conventional fifth wheel coupler, or the like. Most commonly used for this purpose are specialized, heavy duty tow trucks or wreckers, such as those illustrated in U.S. Pat. Nos. 4,384,817, 4,473,334, and 4,611,968.

A trucking firm commonly operates with a fleet of trailers and a number of trailer cabs having a fifth wheel coupler by which the cab couples to and pulls a trailer. Those cabs often become disabled while on the road and must be towed back to a central service center for repair. Most firms, particularly smaller firms, cannot afford the luxury of owning their own wrecker because of its high cost and singular utility. Consequently, they must rely on an independent towing operator to tow the disabled cab in from its field location, sometimes from a significant distance at a substantial cost.

It would be advantageous for a trucking firm to be able to readily adapt one of its conventional cabs for additional use as a tow truck. Removable towing attachments have been purposed in the past, as exemplified by the constructions shown in U.S. Pat. Nos. 3,667,630, 4,000,823, and 4,383,792. However, units such as these are usually intended for use on lighter duty pick-up trucks for towing automobiles, and are unsuitable for usage with heavy duty vehicles. Another proposal shown in U.S. Pat. No. 4,152,006 permanently mounts a lifting boom at the rear of a cab having a conventional fifth wheel coupler, but that construction also has restricted application because the manner in which it may grasp and hold a disabled vehicle is severely limited. U.S. Pat. No. 4,152,006 also refers to detachable units, but discloses no specific structural details.

SUMMARY OF THE INVENTION

Accordingly, the primary object of this invention is to provide a novel, removable, lifting and towing attachment for a heavy duty trailer cab having a fifth wheel coupler, the attachment enabling the cab to be used in conventional fashion to pull a trailer or in lifting and towing fashion to tow a disabled cab or truck.

Another object of the invention is to provide a novel removable towing attachment for a trailer cab having a fifth wheel coupler, the attachment being of simple, compact, unified construction to facilitate its installation and removal from the cab as a complete unit.

Still another object of the invention is to provide the above novel removable towing attachment which readily mounts horizontally on the top frame of the cab without interference with or from the fifth wheel coupler.

A further object of the invention is to provide the above novel towing attachment comprising a boom assembly formed by a horizontal beam and a vertical beam welded thereto, a pair of spaced vertical guide posts fixed on a horizontal mounting plate for guiding the boom assembly for vertical movement, and hydraulic lift cylinder means pivotally connected between the plate and boom assembly for raising and lowering the boom assembly, whereby the beams, guide posts, lift means, and plate connect together as a unitary unit for quick and easy mounting on and off a trailer cab.

Another object of the invention is to provide the above novel towing attachment which readily mounts on the cab by merely bolting the plate on the top of the cab frame and inserting a pivot pin between the forward end of the horizontal beam and pivot brackets fixed on the frame.

Still another object of the invention is to provide the above novel towing attachment further including a tow bar assembly pivotally connected to the lower end of the vertical beam for movement between a raised storage position and a lowered horizontal work position adjacent the ground.

Another object of the invention is to provide the above novel towing attachment wherein the tow bar assembly includes a horizontally extensible and laterally adjustable lifting yoke assembly which accommodates disabled vehicles of different size and frame dimensions, and the towing attachment further includes hydraulic actuator means for pivoting the tow bar assembly between its raised storage and lowered work positions and for extending and retracting the lifting yoke assembly.

A further object of the invention is to provide the above novel towing attachment including an integral hydraulic control valve and conduit mechanism for operating the various hydraulic cylinder means, the mechanism merely requiring quick connection and disconnection of its main feed and dump hoses to hydraulic pump and tank means permanently mounted on the cab, thereby facilitating the mounting and removal of the towing attachment from the cab.

A further object of the invention is to provide the above novel towing attachment wherein the various components are substantially balanced for weight about the pivot connection between the lift cylinder means and mounting plate, thereby simplifying installation and removal of the attachment from the cab.

Still other objects and advantages of the invention will become apparent upon reading the following detailed description of the invention with reference to the accompanying drawings wherein like numerals denote like elements.

DETAILED DESCRIPTION OF THE INVENTION

Figure 3:
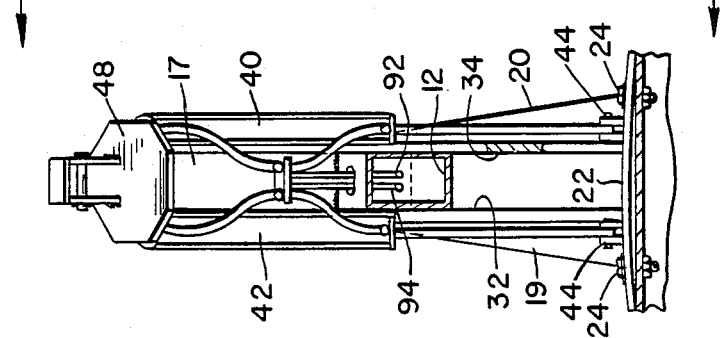
FIG. 3 is an enlarged fragmentary front view taken generally along line 3—3 of FIG. 1.

Referring now to the drawings, the novel lifting and towing attachment 10 of the invention comprises a boom assembly 11 including horizontal beam 12 and vertical inclined beam 14 welded together at an upper angle 15 of about 60 degrees at a location 16 intermediate the upper end 17 and lower end 18 of beam 14, the beams being formed by heavy duty 10×5×½ rectangular steel tubing. Beams 12 and 14, in the area of location 16, are slidable up and down within spaced vertical guide posts 19 and 20 welded on a horizontal mounting plate 22 which readily fastens via bolts 24 onto the rear section of horizontal frame assembly 26 of a trailer cab 28, to the rear of a conventional fifth wheel coupler 30 which is adjustable front to back on frame 26. Upper and lower ends 17 and 18 extend toward the front and rear, respectively, of guide posts 19 and 20. As seen best in FIG. 3, plastic bearing strips 32 and 34 are fixed on the inside faces of guide posts 19 and 20 to enhance vertical sliding movement of beams 12 and 14. Also, plate 22 is slightly crowned or bowed in its normal, no-load condition shown in FIG. 3.

A pair of hydraulic lift cylinders 40 and 42, located on opposite sides of beams 12 and 14 in front of posts 18 and 20, have their rod ends pivotally connected at 44 to plate 22 and their cylinder ends pivotally connected at 46 to an end plate 48 welded on the upper end 17 of beam 14.

A fabricated pivot mount 50 is welded on the bottom of the front end of beam 12 and has a transverse opening which aligns with openings in laterally spaced brackets 52 welded on the front of frame 26 to the front of coupler 30. A transverse pivot pin 54 extends through the aligned openings to pivotally connect beam 12 to brackets 52.

A box-type weldment 56, formed by two side plates 58 and 60 and a bottom plate 62, is welded on the bottom of beam 14. A tow bar assembly 64 pivots between a raised stored position (FIG. 1) and a lowered horizontal work position (FIG. 2). The assembly includes a first tubular member 66 pivotally attached by pin 68 to plates 58 and 60, with the inner end of member 66 being received and supported within weldment 56 in the lowered work position of FIG. 2. An hydraulic cylinder 70 connects between beam 14 and member 66 to raise and lower assembly 64.

A second tubular member 72 is telescopically slidably mounted within member 66 and, to accommodate different sized and shaped vehicles, is extensible between the solid line and phantom line positions shown in FIG. 2 via hydraulic cylinder 74 acting between members 66 and 72. A cross bar 76 extends through and is pivotally connected to the outer end of member 72, and a pair of square tubular sockets 78 and 80 are welded on the ends of bar 76 to receive yokes 82 adapted to engage under the axles or frame of a disabled vehicle. Chain segments 84 wrap around the axles as the vehicle is being towed.

An hydraulic control valve mechanism 90 is mounted directly on the side of beam 14 and is connected via suitable flexible hoses to cylinders 40 and 42, cylinder 70, and cylinder 74, all of which are of the double-acting type. The main hydraulic feed and dump hoses 92 and 94 extend from valve mechanism 90 through beams 14 and 12 and out through the front open end of beam 12, with feed hose 92 and dump hose 94 being connected to hydraulic pump 96 and tank 98, respectively, located at the front of the cab frame. Hoses 92 and 94 are provided with quick disconnect couplings.

Figure 1:
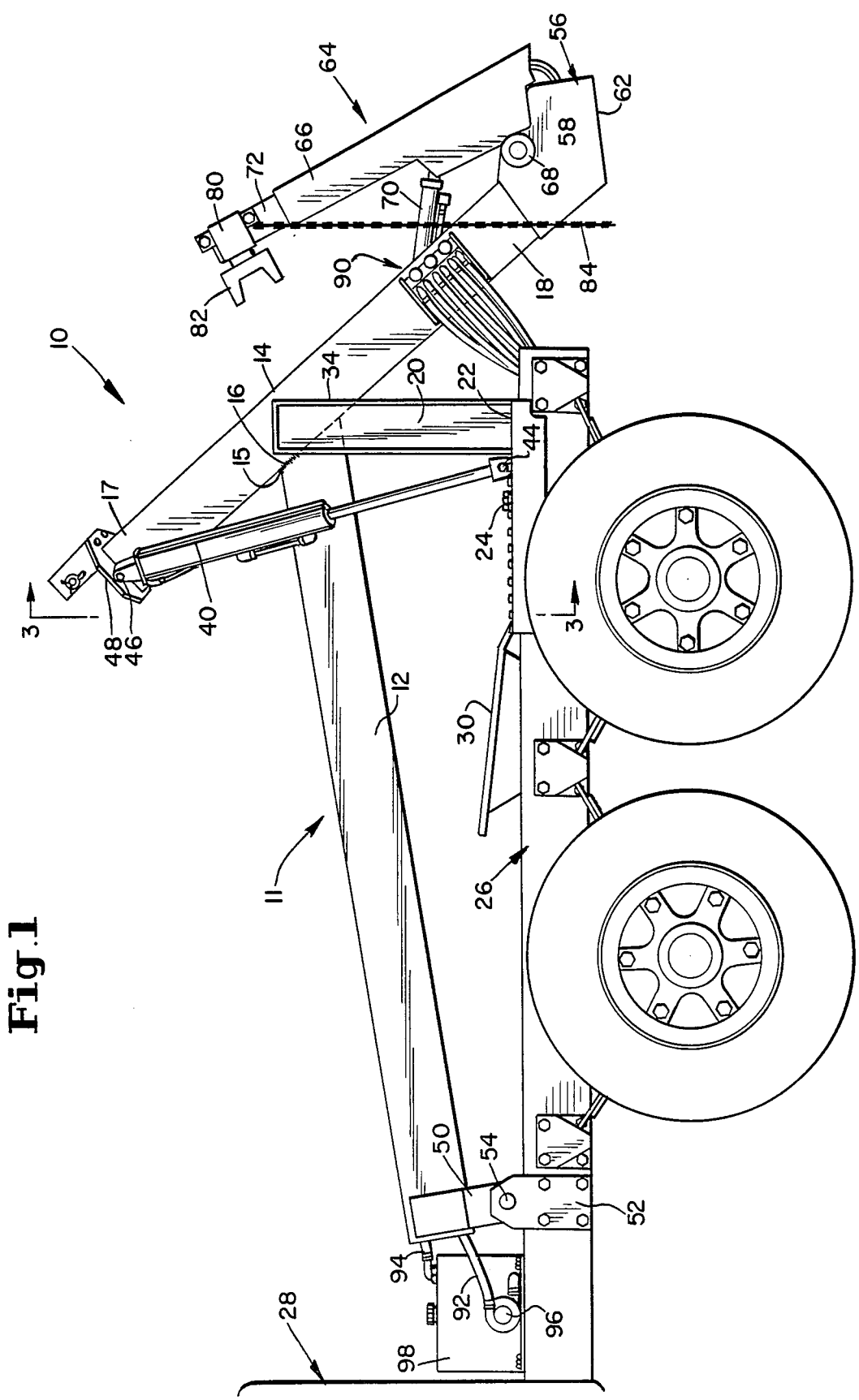
FIG. 1 is a general left side elevation perspective view illustrating the novel lifting and towing attachment of the invention mounted on a trailer cab with a conventional fifth wheel coupler, with the tow bar assembly shown in its raised storage position.
Figure 2:
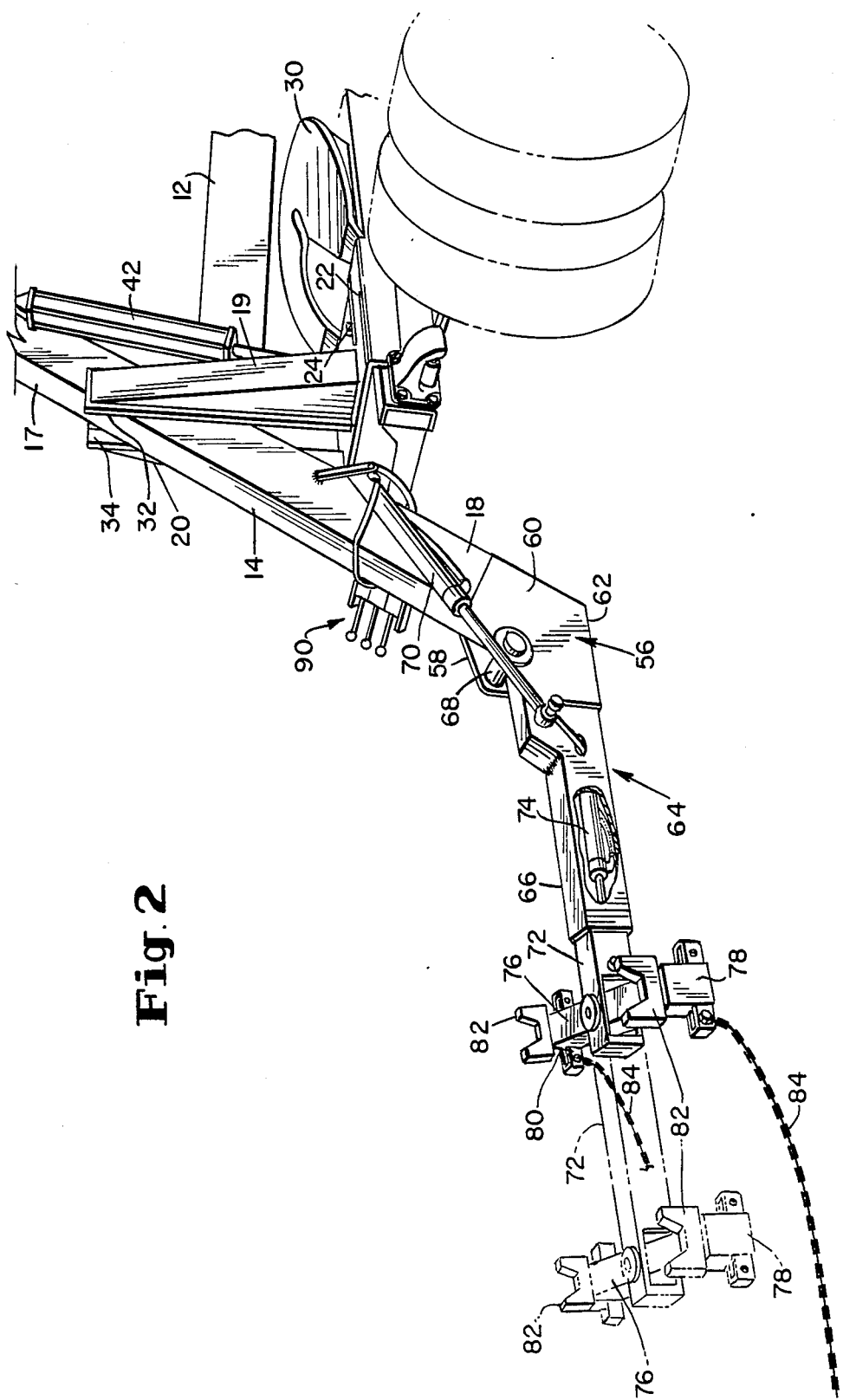
FIG. 2 is a fragmentary right side perspective view similar to FIG. 1, but illustrating the tow bar assembly in its lowered horizontal work position.
Figure 4:
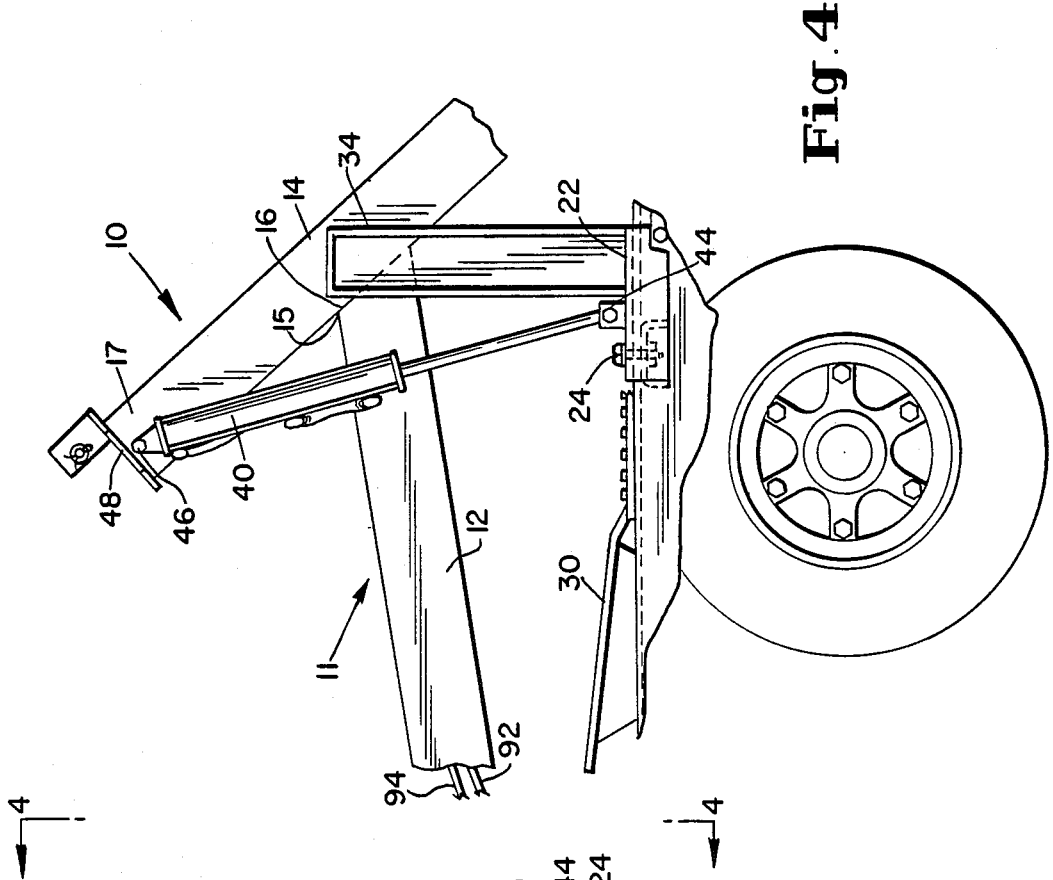
FIG. 4 is an enlarged fragmentary side view taken generally along line 4—4 of FIG. 3.

Under normal circumstances attachment 10 is removed from cab 28 and the components are in their stored condition of FIG. 1. Thus, the cab is available for use in its usual fashion for pulling a trailer via coupler 30. When it becomes desirable to use cab 28 as a tow truck, attachment 10 is merely lifted by a crane or forklift and plate 22 is placed on frame 26. After the openings in mount 50 and brackets 52 are aligned and pivot pin is put in place, plate 22 is fastened to the frame by bolts 24. To facilitate this operation, the weight of attachment 10 is substantially equally balanced about the pivot connections 44 of cylinders 40 and 42 to plate 22. This simplifies overall handling of attachment 10 and insertion and removal of pin 54. Hoses 92 and 94 are quickly connected to pump 96 and tank 98, and cab 28 with attachment 10 is now ready for lifting and towing a disabled vehicle. Beams 12 and 14 and assembly 64 are in their raised storage position of FIG. 1.

As cab 28 is positioned with respect to the disabled vehicle, valve mechanism 90 is actuated to energize cylinder 70 to pivot assembly 64 to its horizontal position and then energize cylinders 40 and 42 to lower beam 14 and assembly 64 to the work position of FIG. 2 adjacent the ground. Mechanism 90 is then actuated to energize cylinder 74 to extend member 72 an appropriate distance underneath either the front or rear of the disabled vehicle to engage yokes 82 with the vehicle axles or frame. Chains 84 are wrapped around the axles to secure them in place. Cylinders 40 and 42 are then actuated by mechanism 90 to raise beams 12 and 14 and lift the front or rear wheels of the vehicle off the ground. The weight of the disabled vehicle is transmitted through beams 12 and 14 and cylinders 40 and 42 on to crowned plate 22, thereby forcing plate 22 to flatten and causing vertical guide posts 19 and 20 to squeeze against the sides of beams 12 and 14 in the area of connecting location 16. This squeezing effect helps maintain lateral stability of beams 12 and 14 and the disabled vehicle as the vehicle is being towed.

When the disabled vehicle is released, the components of attachment 10 are returned to their storage position of FIG. 1. The attachment is quickly and easily removed from cab 28 by first disconnecting hoses 92 and 94 and then removing pivot pin 54 and bolts 24. Cab 28 is again ready for use in its usual manner.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A lifting and towing attachment for use on a trailer cab having a horizontal frame with front and rear ends, the attachment comprising a boom assembly including a substantially horizontal beam portion, a generally vertical beam portion rigidly connected to said horizontal beam portion, and a tow bar assembly connected to a lower end of said vertical beam portion for engaging a disabled vehicle, substantially horizontal mounting plate means adapted to be readily mounted on the rear of said frame, a pair of spaced vertical guide posts fixed on said plate means, said boom assembly being mounted between said guide posts for vertical sliding movement, a front end of said horizontal beam portion adapted to be pivotally connected to the front of said frame, power lift means connected between said plate means and said boom assembly for moving said boom assembly up and down within said guide posts between raised and lowered positions, said horizontal plate means being crowned so as to be flattened when said lift means raises said boom assembly and a disabled vehicle engaged by said tow bar assembly, thereby causing said guide posts to squeeze against and laterally stabilize said boom assembly during transportation of the disabled vehicle, whereby said boom assembly, said plate means, said guide posts, and said lift means are readily attachable and detachable as a complete unit from said frame.

2. The attachment of claim 1, said horizontal beam portion being angularly connected to said vertical beam portion at a location intermediate its upper and lower ends, the upper end of said vertical beam portion leaning forwardly of said guide posts and the lower end extending rearwardly thereof to clear a rear of the cab as the boom assembly is lowered to ground level, said lift means connected between said upper end of said vertical beam portion and said plate means.

3. The attachment of claim 2, wherein the connection of said horizontal and vertical beam portions is guided for vertical sliding movement within said guide posts.

4. The attachment of claim 1, wherein said boom assembly is substantially balanced for weight about a point connecting said power lift means and said plate means when said boom assembly is in said raised position, thereby facilitating quick and easy mounting and removal of the attachment from a trailer cab.

5. The attachment of claim 1, said tow bar assembly being pivotally connected to the lower end of said vertical beam portion for movement between a raised storage position and a lowered generally horizontal work position, and actuator means connected between said vertical beam portion and said tow bar assembly for moving said tow bar assembly.

6. The attachment of claim 5, said tow bar assembly including adjustable vehicle engaging means adapted to accommodate vehicles of different size and dimensions.

7. A lifting and towing attachment for use on a trailer cab having a horizontal frame, the attachment comprising a boom assembly including a substantially horizontal beam having front and rear ends, a vertical inclined beam having upper and lower ends and being rigidly connected to said horizontal beam at a location intermediate said upper and lower ends, and a tow bar assembly pivotally connected to said lower end of said vertical beam for movement between a raised storage position and lowered generally horizontal work position, said tow bar assembly including adjustable vehicle engaging means adapted to accommodate vehicles of different size and dimensions, and actuator means connected between said vertical beam and said tow bar assembly for moving said tow bar assembly; substantially horizontal mounting plate means adapted to be readily mounted on a rear of said frame; a pair of spaced vertical guide posts fixed on said plate means; said intermediate location of said vertical inclined beam being mounted between said guide posts for vertical sliding movement, the upper and lower ends of said vertical beam extending forwardly and rearwardly of said guide posts, the front end of said horizontal beam adapted to be pivotally connected to a front of said frame; power lift means connected between said plate means and said upper end of said vertical beam for moving said boom assembly up and down between raised and lowered positions; whereby said boom assembly, said plate means, said guide posts and said lift means are readily attached and removed as a complete unit from said frame.

8. The attachment of claim 7, wherein said boom assembly is substantially balanced for weight about the connection point of said power lift means and said plate means when said boom assembly and said tow bar assembly are in their raised positions, thereby facilitating the mounting and removal of the attachment from the cab.

9. The attachment of claim 8, wherein said horizontal plate means is crowned so as to be flattened when said lift means raises said boom assembly and a disabled vehicle engaged by said tow bar assembly, thereby causing said guide posts to squeeze against and laterally stabilize said boom assembly during transportation of the disabled vehicle.

10. The attachment of claim 7, wherein said horizontal plate means is crowned so as to be flattened when said lift means raises said boom assembly and a disabled vehicle engaged by said tow bar assembly, thereby causing said guide posts to squeeze against and laterally stabilize said boom assembly during transportation of the disabled vehicle.

11. The attachment of claim 7, said power lift means and said actuator means being hydraulic cylinders, and control valve means mounted on said vertical beam and connected to said cylinders, and conduit means having one end connected to said valve means and another end adapted to be readily connected and disconnected to a pump and tank on the cab.

12. The attachment of claim 11, said tow bar assembly including hydraulic cylinder means connected to said valve means for adjusting said vehicle engaging means.

* * * * *